(12) United States Patent
Nguyen

(10) Patent No.: US 8,468,712 B2
(45) Date of Patent: Jun. 25, 2013

(54) METHOD FOR BONDING A TRANSPARENT SUBSTRATE TO A LIQUID CRYSTAL DISPLAY AND ASSOCIATED DEVICE

(75) Inventor: Thuan V. Nguyen, Westminster, CA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 397 days.

(21) Appl. No.: 12/742,372

(22) PCT Filed: Nov. 11, 2008

(86) PCT No.: PCT/US2008/083082
§ 371 (c)(1),
(2), (4) Date: May 11, 2010

(87) PCT Pub. No.: WO2009/064705
PCT Pub. Date: May 22, 2009

(65) Prior Publication Data
US 2010/0265444 A1    Oct. 21, 2010

Related U.S. Application Data

(60) Provisional application No. 61/002,802, filed on Nov. 13, 2007.

(51) Int. Cl.
*G02F 1/1333*    (2006.01)

(52) U.S. Cl.
USPC ............................. 34/122; 349/137; 349/155

(58) Field of Classification Search
None
See application file for complete search history.

(56) References Cited

U.S. PATENT DOCUMENTS

| | | | |
|---|---|---|---|
| 5,897,727 A | 4/1999 | Staral et al. | |
| 6,528,142 B2 * | 3/2003 | Ikegaya et al. | 428/141 |
| 2007/0222934 A1 * | 9/2007 | Huang et al. | 349/155 |

FOREIGN PATENT DOCUMENTS

| | | |
|---|---|---|
| JP | 2008/278508 A | 10/1996 |
| JP | 2006316231 A | 11/2006 |

* cited by examiner

*Primary Examiner* — Lucy Chien
(74) *Attorney, Agent, or Firm* — John R. Dodd; John H. Lamming

(57) ABSTRACT

A "dam and fill" method for bonding a transparent substrate to a liquid crystal display is disclosed which method provides means for effectively containing uncured/partially cured adhesive prior to bonding using the method. Also described is an associated device, made using the "dam and fill" method, which has precise targeted spacing between the transparent substrate and the liquid crystal display.

20 Claims, No Drawings

METHOD FOR BONDING A TRANSPARENT SUBSTRATE TO A LIQUID CRYSTAL DISPLAY AND ASSOCIATED DEVICE

CROSS REFERENCE TO RELATED APPLICATION

This patent application claims the benefit of U.S. Provisional Patent Application Ser. No. 61/002,802 filed on 13 Nov. 2007.

FIELD OF THE INVENTION

The invention is directed to a method for bonding a transparent substrate to a surface of a liquid crystal display (LCD). The invention is also directed to a device made using the method of the invention.

BACKGROUND OF THE INVENTION

In today's market, flat panel displays, such as liquid crystal displays (LCDs), are often enhanced with specialized films (substrates). The films may be flexible or rigid. Such films are designed to optimize optical performance, e.g., viewing contrast, increasing brightness, removing glare, enhancing color and enhancing the clarity of the flat panel display. The films are typically applied to the viewing side of the display. Application methods involve the use of an adhesive that is optically clear and pressure sensitive for easy bonding of the film (substrate) directly to the display.

Prior art methods of applying a photocurable adhesive composition to a display for bonding a substrate to the display entail application of a measured amount of the adhesive composition to the display (or substrate), placing the substrate (or display) in contact with the adhesive composition, and then photocuring the adhesive composition to afford the substrate bonded to the display through the photocured adhesive. There are problems associated with these prior art methods of bonding. First there is nothing available to contain the adhesive during photocuring to effect bonding. Consequently, adhesive can and often does flow out of the display/adhesive/substrate sandwich during bonding onto the bonding fixture such that the targeted amount of cured adhesive is not present in the bonded product which can result in increased levels of defectivity in bonded products. In addition, the adhesive or cured adhesive if present on the bonding fixture from undesirable flow out can be difficult to remove during cleanup and increase bonding process time. Second there is nothing available in prior art methods to keep a fixed distance between the display and the substrate in the bonded product. Variations in depth of cured adhesive in the bonded product can also lead to increased defectivity levels. The present invention provides a solution to reduce or eliminate the above drawbacks.

SUMMARY OF THE INVENTION

A "dam and fill" technique is employed in the present invention to provide a dam to contain adhesive within a predefined area prior to and during bonding to bond a substrate to an LCD. Having this dam in place prevents undesirable adhesive run out during bonding. A photocured dam that is produced during execution of the process of this invention serves as a spacer to maintain a fixed distance between display and substrate in display/cured adhesive/substrate bonded product. Having this spacer results in essentially constant cured adhesive levels in bonded products.

In an embodiment, the invention is a method for bonding a transparent substrate to a surface of a liquid crystal display having a perimeter of a predefined area of the surface comprising the steps of:

a) applying a photocurable dam composition to the surface of the liquid crystal display along the perimeter of the predefined area of the surface over which the transparent substrate is to be bonded;

b) exposing the photocurable dam composition applied in step a) to actinic radiation to at least partially photocure the photocurable dam composition and afford a dam having a thickness and shaped to contain the adhesive within the predefined area;

c) placing a measured amount of a photocurable adhesive composition on the surface of the liquid crystal display within the dam;

d) contacting the transparent substrate with the dam and the photocurable adhesive composition; and e) exposing the photocurable adhesive composition placed in step c) to actinic radiation to photocure the photocurable adhesive composition affording a photocured adhesive;

whereby the transparent substrate is now bonded to the liquid crystal display through the photocured adhesive and the dam resulting in a transparent substrate-bonded liquid crystal display.

In another embodiment, the invention is a device comprising a transparent substrate, a liquid crystal display having a surface and a perimeter of the surface, a dam, and a photocured adhesive, wherein the device is made by the steps of:

a) applying a photocurable dam composition to the liquid crystal display along the perimeter of the predefined area over which the transparent substrate is to be bonded;

b) exposing the photocurable dam composition applied in step a) to actinic radiation to at least partially photocure the photocurable dam composition and afford a dam and shaped to contain the adhesive within the predefined area;

c) placing a measured amount of the photocurable adhesive composition on the surface of the liquid crystal display within the dam;

d) contacting the transparent substrate with the dam and the photocurable adhesive composition; and e) exposing the photocurable adhesive composition placed in step c) to actinic radiation to photocure the photocurable adhesive composition affording the photocured adhesive;

whereby the transparent substrate is now bonded to the liquid crystal display through the photocured adhesive and the dam to afford the device.

DETAILED DESCRIPTION OF THE INVENTION

As described supra, in an embodiment, the invention is a method for bonding a transparent substrate to a surface of a liquid crystal display (LCD) using a photocurable adhesive composition. In this application, the term "liquid crystal display" means a total display that includes the liquid crystal portion, various other films and/or layers present in the display, and, if present, a bezel (housing) for the display. The bezel can be any structural support or housing that holds the layers/films of the display in place, and which provides rigidity and adds structural integrity. The method involves initially applying (in step a) a photocurable dam composition to a surface of a liquid crystal display, which surface can be a surface in the viewing area of the display, can be a surface in the non-viewing area of the display, and/or can be a surface on the bezel. The photocurable dam composition is applied along a perimeter of a predefined area over which the transparent substrate is to be bonded. The predefined area and its perimeter are not limited. In an embodiment, the predefined area is the area represented by the front face of the liquid crystal display and the perimeter is that of the front face of the liquid crystal display. As indicated above, the predefined area and its perimeter can include the entire display including the bezel and/or part or all of the non-viewing area, only the viewable area of the display, or only a portion of the viewable area.

The photocurable adhesive composition can be, but is not limited to, a composition comprising a) a polymer or an oligomer; b) a photopolymerizable monomer; and c) a photoinitiator. Other components known to those skilled in the art of photocurable compositions can be present. The photocurable adhesive employed in the method can be any composition that is photocurable upon exposure to a sufficient amount of actinic radiation to afford a photocured adhesive having adhesive properties suitable for bonding a transparent substrate to a LCD. In an embodiment, the photocurable adhesive composition is a liquid at ambient temperature. In an embodiment, the photocurable adhesive composition is a transparent or clear adhesive.

The photocurable dam composition can be any composition that is photocurable upon exposure to a sufficient amount of actinic radiation to afford a dam that remains structurally intact under the bonding conditions employed, which may involve elevated temperatures and pressures. The photocurable dam composition can be, but is not limited to, a composition comprising a) a polymer or an oligomer; b) a photopolymerizable monomer; c) a photoinitiator; and d) a viscosity control agent. Other components known to those skilled in the art of photocurable compositions can be present. In an embodiment, the photocurable dam composition is a photocurable adhesive composition to which a viscosity control agent has been added. In an embodiment, the viscosity control agent serves to increase the viscosity of the composition to which it is being added. A suitable viscosity control agent includes, but is not limited to, an inorganic filler and a polymer. The polymer can be, but is not limited to, any polymer known in the art to being a viscosity control agent that serves to increase the viscosity of the composition to which it is added. Suitable inorganic fillers include, but are not limited to, silica, alumina, ceria, and titania. In an embodiment, the photocurable dam composition is a liquid at ambient temperature. In an embodiment, the photocurable dam composition is a transparent or clear adhesive. In one particular embodiment, the photocurable adhesive used in the photocurable dam composition can be the same composition as the photocurable adhesive contained by the dam according to the method.

Any method can be employed for applying the photocurable dam composition to the surface of the liquid crystal display. Suitable non-limiting application methods include application with a robotic device and manual application by a human.

In the next step (step b) of the bonding method, the photocurable dam composition is exposed to actinic radiation to at least partially photocure the photocurable dam composition and afford a dam having a thickness and shaped to contain the adhesive within the predefined area. In an embodiment, the actinic radiation utilized is ultraviolet (UV) light. Any suitable device known in the art can be employed to generate the actinic radiation for exposing the photocurable composition.

In the next step (step c) of the bonding method, a measured amount of a photocurable adhesive composition is placed on the surface of the liquid crystal display within the dam. Any known method of measuring and placing the composition can be employed in this step. In one embodiment, a robotic arm can be used to measure out and place the photocurable adhesive composition on the surface of the LCD. Step c) can be carried out at ambient temperature or at a temperature higher than ambient temperature.

The next step (step d) entails contacting the transparent substrate with the dam and the photocurable adhesive composition that are on the surface of the LCD. Any method of contacting can be employed in this step. Non-limiting examples include use of robotics or manual human labor to bring the transparent substrate in contact with the dam and the photocurable adhesive composition. Step d) can be carried out at ambient temperature or at a temperature higher than ambient.

In an embodiment, at least step c) or step d) is carried out at a temperature higher than ambient temperature.

The transparent substrate can be any substrate that is transparent to light in the visible and ultraviolet region of the electromagnetic spectrum. More specifically, a substrate is transparent if it passes at least 45 percent of incident visible and ultraviolet electromagnetic radiation in the wavelength range of 320-500 nanometers passing through the substrate when the radiation is incident normal to an outer surface of the substrate. These transparent substrates have sufficient transparency when UV A/visible radiation is passed through them to cure UV A/visible-curable adhesives for bonding according to the invention. In an embodiment, the transparent substrate is transparent to both visible and ultraviolet light. In one embodiment, the transparent substrate is an antireflective layer.

The next step (step e) is exposing the photocurable adhesive composition placed in step d) to actinic radiation to photocure the photocurable adhesive composition to afford a photocured adhesive. In an embodiment, the actinic radiation utilized is ultraviolet (UV) light. Any suitable device known in the art can be employed to generate the actinic radiation for exposing the photocurable composition. In certain embodiments, execution of step e) can result in further photocuring of the dam to increase its degree of photocuring.

The dam, both after its initial formation in step b) and after additional possible photocuring in step e) can have adhesive properties and thereby contribute to bonding of the transparent substrate to the LCD along with the photocured adhesive.

After execution of steps a)-e) of the method as discussed above, the transparent substrate is now bonded to the LCD through the photocured adhesive and the dam resulting in a transparent substrate-bonded LCD. In an embodiment, the transparent substrate is bonded to a front surface of the LCD. The front surface of the LCD is the viewing side of the LCD. In an embodiment, the photocurable dam composition is applied in step a) along all of the perimeter of the front surface of the LCD.

In an embodiment of the method of the invention, the transparent adhesive and the photocurable dam composition have substantially the same refractive index as the transparent substrate. For purposes of this invention, objects/elements have substantially the same refractive index to each other if their respective refractive indices are within 5 percent of each other. In other embodiments, objects/elements have substantially the same refractive index to each other if their respective refractive indices are within 10 percent, 1 percent, 0.5 percent, and 0.1 percent of each other. In an embodiment where the transparent substrate is glass or a similar material, the refractive indices of the transparent substrate, the dam, and the cured adhesive will be 1.5 plus or minus 5%.

The device of the invention comprises a transparent substrate, a liquid crystal display, a dam, and a photocured adhesive, wherein the device is made by the steps a)-e) of the method of the invention as discussed supra.

In an embodiment, the device is one made according to the method wherein, prior to photocuring, the photocurable adhesive composition utilized is a liquid at room temperature.

In an embodiment, the device is one made according to the method wherein the transparent layer is an antireflective layer.

In an embodiment, the device is one made according to the method wherein the transparent layer is an antireflective layer.

In an embodiment, the device is one made according to the method wherein the transparent layer is a touch panel, such as a touch panel display for use in a computer.

In an embodiment, the device is one made according to the method wherein the transparent layer is a viewing contrast layer.

In an embodiment, the device is one made according to the method wherein the transparent layer is a brightness enhancing layer.

In an embodiment, the device is one made according to the method wherein the transparent layer is a color and clarity enhancing layer.

In an embodiment, the device is one made according to the method wherein the transparent layer is an antiglare layer.

In an embodiment, the device is one made according to the method wherein the transparent layer is a scratch resistant layer.

In an embodiment, the device is one made according to the method wherein at least step c) or step d) used in making the device is carried out at a temperature higher than ambient temperature.

In an embodiment, the device is one made according to the method wherein the photocurable dam composition used in making the dam contains a viscosity control agent, which can be an inorganic filler or a polymer.

In an embodiment, the device is one made according to the method wherein the inorganic filler is selected from the group consisting of silica, alumina, ceria, and titania.

In an embodiment, the device is one made according to the method wherein the distance between a surface of the transparent substrate that is closest to the liquid crystal display and a surface of the liquid crystal display that is closest to the transparent substrate in the device is equal to the thickness of the dam. In this embodiment, the dam serves not only as a dam but also as a spacer to define and maintain a fixed distance between the LCD and the transparent substrate in the transparent substrate-bonded liquid crystal display.

In an embodiment, the device is one made according to the method wherein the photocurable adhesive is a transparent, preferably clear, adhesive.

In an embodiment, the device is one made according to the method wherein the transparent substrate is bonded to a front surface of the liquid crystal display. The front surface of the LCD is the viewing side of the LCD. In an embodiment, the photocurable dam composition is applied in step a) along all of the perimeter of the front surface of the LCD In an embodiment, the device is one made according to the method wherein each of the transparent adhesive and the photocurable adhesive composition has substantially the same refractive index as the transparent substrate.

EXAMPLES

Example 1

In this example, the method according to the invention was carried out using a photocurable adhesive and a photocurable dam to bond an antireflective plate to a liquid crystal display.

The (uncured) liquid adhesive had the following composition:
Isobornyl acrylate (SR506)—44.38%
1-hydroxycycohexylphenyl ketone (Irgacure® 184)—1.6%
Pentaerythritol tetrakis (3-mercaptopropionate) PETAMAP—7.60%
Aliphatic urethane diacrylate (Ebecryl® 230)—46.42%
TOTAL—100 WT. %

The (uncured) liquid dam had the following composition:
Isobornyl acrylate (SR506)—42.16 wt. %
1-hydroxycycohexylphenyl ketone (Irgacure® 184)—1.52 wt. %
Pentaerythritol tetrakis (3-mercaptopropionate) PETAMAP—7.22 wt %
Aliphatic urethane diacrylate (Ebecryl® 230)—44.10 wt. %
Fumed silica (DeGussa A200)—5 wt. %
TOTAL—100 WT. %.

The LCD was a 15 inch LCD supplied by NEC. The LCD was placed in a framework. Liquid dam was applied to the front face of the LCD along the perimeter of the LCD that was now not under the framework upon its placement in the framework. The dam was then photocured sufficiently to afford a solid dam of the desired thickness. Liquid adhesive (78 grams) was then placed on the LCD front face inside the dammed area and distributed, if necessary, to give a uniform coating throughout the dammed area. An antireflective glass plate was then carefully placed on top of the cured dam/liquid adhesive area and this assembly was then photocured to give the bonded LCD having an antireflective plate bonded to it by the photocured adhesive/dam. The bonding in this example was strong and was completed with no leakage of adhesive material outside the desired area, such as leakage onto the framework.

Example 2

Comparative

In this comparative example, the same compositions were used as in Example 1. The method of bonding was also the same except that no dam was employed. An amount of adhesive was used that was equal to the total amount of adhesive plus dam in Example 1. The bonding was completed and was also strong but there was significant leakage of adhesive outside of the desired areas to be bonded onto the framework during the time period after adhesive was applied to the LCD and prior to its completely being photocured. This leakage into undesired areas was highly undesirable and required significant time and effort to clean equipment (e.g., the framework) after bonding had been completed.

What is claimed is:

1. A method for bonding a transparent substrate to a front surface of a liquid crystal display having a perimeter of a predefined area of the surface comprising the steps of:
   a) applying a photocurable dam composition to the surface of the liquid crystal display along the perimeter of the predefined area of the surface over which the transparent substrate is to be bonded, wherein the photocurable dam composition is applied along all of the perimeter of the front surface of the liquid crystal display;

b) exposing the photocurable dam composition applied in step a) to actinic radiation to at least partially photocure the photocurable dam composition and afford a dam having a thickness and shaped to contain adhesive within the predefined area;

c) placing a measured amount of a photocurable adhesive composition on the surface of the liquid crystal display within the dam;

d) contacting the transparent substrate with the dam and the photocurable adhesive composition; and e) exposing the photocurable adhesive composition placed in step c) to actinic radiation to photocure the photocurable adhesive composition affording a photocured adhesive;

whereby the transparent substrate is now bonded to the liquid crystal display through the photocured adhesive and the dam resulting in a transparent substrate-bonded liquid crystal display.

2. The method of claim 1 wherein the photocurable adhesive composition is a liquid at ambient temperature.

3. The method of claim 1 wherein the transparent substrate is an antireflective layer.

4. The method of claim 1 wherein at least step c) or step d) is carried out at a temperature higher than ambient temperature.

5. The method of claim 1 wherein the photocurable dam composition comprises a viscosity control agent.

6. The method of claim 5 wherein the viscosity control agent is an inorganic filler.

7. The method of claim 6 wherein the inorganic filler is selected from the group consisting of silica, alumina, ceria, and titania.

8. The method of claim 1 wherein the photocurable adhesive composition is a transparent adhesive.

9. The method of claim 1 wherein the transparent substrate is bonded to the front surface of the liquid crystal display.

10. A device comprising a transparent substrate, a liquid crystal display having a front surface and a perimeter of the surface, a dam, and a photocured adhesive, wherein the device is made by the steps of:

a) applying a photocurable dam composition to the liquid crystal display along the perimeter of the predefined area over which the transparent substrate is to be bonded, wherein the photocurable dam composition has been applied along all of the perimeter of the front surface of the LCD during fabrication of the device;

b) exposing the photocurable dam composition applied in step a) to actinic radiation to at least partially photocure the photocurable dam composition and afford a dam and shaped to contain the adhesive within the predefined area;

c) placing a measured amount of the photocurable adhesive composition on the surface of the liquid crystal display within the dam;

d) contacting the transparent substrate with the dam and the photocurable adhesive composition; and e) exposing the photocurable adhesive composition placed in step c) to actinic radiation to photocure the photocurable adhesive composition affording the photocured adhesive;

whereby the transparent substrate is now bonded to the liquid crystal display through the photocured adhesive and the dam to afford the device.

11. The device of claim 10 wherein the transparent layer is an antireflective layer.

12. The device of claim 10 wherein at least step c) or step d) used in making the device is carried out at a temperature higher than ambient temperature.

13. The device of claim 10 wherein the photocurable dam composition used in making the dam contains a viscosity control agent.

14. The device of claim 13 wherein the viscosity control agent is an inorganic filler.

15. The device of claim 14 wherein the inorganic filler is selected from the group consisting of silica, alumina, ceria, and titania.

16. The device of claim 10 wherein the distance between a surface of the transparent substrate that is closest to the liquid crystal display and a surface of the liquid crystal display that is closest to the transparent substrate in the device is equal to the thickness of the dam.

17. The device of claim 10 wherein the photocurable adhesive composition is a transparent adhesive.

18. The device of claim 10 wherein the transparent substrate is bonded to the front surface of the liquid crystal display.

19. A method for bonding a transparent substrate to a front surface of a liquid crystal display having a perimeter of a predefined area of the surface comprising the steps of:

a) applying a photocurable dam composition to the surface of the liquid crystal display along the perimeter of the predefined area of the surface over which the transparent substrate is to be bonded;

b) exposing the photocurable dam composition applied in step a) to actinic radiation to at least partially photocure the photocurable dam composition and afford a dam having a thickness and shaped to contain the adhesive within the predefined area;

c) placing a measured amount of a photocurable adhesive composition on the surface of the liquid crystal display within the dam;

d) contacting the transparent substrate with the dam and the photocurable adhesive composition; and e) exposing the photocurable adhesive composition placed in step c) to actinic radiation to photocure the photocurable adhesive composition affording a photocured adhesive;

wherein at least step c) or step d) is carried out at a temperature higher than ambient temperature; and whereby the transparent substrate is now bonded to the liquid crystal display through the photocured adhesive and the dam resulting in a transparent substrate-bonded liquid crystal display.

20. A device comprising a transparent substrate, a liquid crystal display having a surface and a perimeter of the surface, a dam, and a photocured adhesive, wherein the device is made by the steps of:

a) applying a photocurable dam composition to the liquid crystal display along the perimeter of the predefined area over which the transparent substrate is to be bonded;

b) exposing the photocurable dam composition applied in step a) to actinic radiation to at least partially photocure the photocurable dam composition and afford a dam and shaped to contain the adhesive within the predefined area;

c) placing a measured amount of the photocurable adhesive composition on the surface of the liquid crystal display within the dam;

d) contacting the transparent substrate with the dam and the photocurable adhesive composition; and e) exposing the photocurable adhesive composition placed in step c) to actinic radiation to photocure the photocurable adhesive composition affording the photocured adhesive;

wherein at least step c) or step d) is carried out at a temperature higher than ambient temperature; and whereby the transparent substrate is now bonded to the liquid crystal display through the photocured adhesive and the dam to afford the device.

* * * * *